(12) United States Patent
Honma et al.

(10) Patent No.: US 9,520,623 B2
(45) Date of Patent: Dec. 13, 2016

(54) GRID-CONNECTED POWER SUPPLY SYSTEM

(75) Inventors: Masaya Honma, Osaka (JP); Susumu Kobayasi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 840 days.

(21) Appl. No.: 13/498,462

(22) PCT Filed: Aug. 30, 2010

(86) PCT No.: PCT/IB2010/002112
§ 371 (c)(1),
(2), (4) Date: Mar. 27, 2012

(87) PCT Pub. No.: WO2011/036523
PCT Pub. Date: Mar. 31, 2011

(65) Prior Publication Data
US 2012/0181864 A1    Jul. 19, 2012

(30) Foreign Application Priority Data

Sep. 28, 2009 (JP) ................................. 2009-223351

(51) Int. Cl.
*H02J 9/00* (2006.01)
*H01M 10/44* (2006.01)
(Continued)

(52) U.S. Cl.
CPC ............... *H01M 10/44* (2013.01); *H02J 3/32* (2013.01); *H02J 3/383* (2013.01); *H02J 3/386* (2013.01);
(Continued)

(58) Field of Classification Search
CPC ............ H01M 10/44; H02J 3/32; H02J 3/383; H02J 3/386; Y02E 10/563; Y02E 10/566; Y02E 10/763; Y02E 70/30
See application file for complete search history.

(56) References Cited

U.S. PATENT DOCUMENTS

| | | | |
|---|---|---|---|
| 6,512,966 B2 * | 1/2003 | Lof | F03D 7/0284 290/44 |
| 2003/0047209 A1 * | 3/2003 | Yanai | H02J 3/32 136/244 |

(Continued)

FOREIGN PATENT DOCUMENTS

| | | |
|---|---|---|
| JP | H638384 A | 2/1994 |
| JP | H10201129 | 7/1998 |

(Continued)

OTHER PUBLICATIONS

Japanese Office Action dated Apr. 1, 2014 issued in a corresponding Japanese application No. 2009-130973 and the English summary thereof.

(Continued)

*Primary Examiner* — Rexford Barnie
*Assistant Examiner* — Elim Ortiz
(74) *Attorney, Agent, or Firm* — Bacon & Thomas, PLLC

(57) ABSTRACT

A grid-connected power supply system includes a power generation apparatus configured to generate power by using natural energy and connected in parallel to a commercial power grid; a electricity storage device; and a control device configured. The control device predicts an amount of power to be generated on a subsequent day by the power generation apparatus and a power demand of the loads and charges the electricity storage device with power in a time zone in which an electricity rate of the commercial power grid is relatively low if a predicted value of the amount of power to be generated is lower than a predicted value of the power demand, or does not charge the electricity storage device with power during the time zone if the predicted value of the (Continued)

amount of power to be generated is not lower than the predicted value of the power demand.

5 Claims, 2 Drawing Sheets

(51) Int. Cl.
    *H02J 3/32*     (2006.01)
    *H02J 3/38*     (2006.01)

(52) U.S. Cl.
    CPC ............ *Y02E 10/563* (2013.01); *Y02E 10/566* (2013.01); *Y02E 10/763* (2013.01); *Y02E 70/30* (2013.01); *Y10T 307/344* (2015.04)

(56) References Cited

U.S. PATENT DOCUMENTS

| | | | | |
|---|---|---|---|---|
| 2003/0078797 | A1* | 4/2003 | Kanbara | G06Q 30/00 705/412 |
| 2007/0276547 | A1* | 11/2007 | Miller | G06Q 50/06 700/295 |
| 2008/0234871 | A1* | 9/2008 | Yamada | G06Q 50/06 700/286 |
| 2010/0262312 | A1* | 10/2010 | Kubota | H01M 10/425 700/295 |
| 2012/0187913 | A1* | 7/2012 | Abe | H01M 10/44 320/134 |

FOREIGN PATENT DOCUMENTS

| | | |
|---|---|---|
| JP | 2002369406 | 12/2002 |
| JP | 2007295680 A | 11/2007 |
| JP | 200867439 A | 3/2008 |
| JP | 2008289276 A | 11/2008 |
| JP | 2009-130973 | 6/2009 |
| WO | 0229952 A1 | 4/2002 |

OTHER PUBLICATIONS

The International Search Report for PCT/IB2010/002112.

* cited by examiner

GRID-CONNECTED POWER SUPPLY SYSTEM

FIELD OF THE INVENTION

The present invention relates to a grid-connected power supply system in which a power generation apparatus using natural energy, such as a solar power generation apparatus or a wind power generation apparatus, is associated with a commercial power grid.

BACKGROUND OF THE INVENTION

As a conventional grid-connected power supply system, there is provided, for example, a grid-connected solar power generation system having a electricity storage device that systematically interconnects a solar power generation apparatus and a commercial power grid and can be charged by both of them. The electricity storage device is charged with power supplied from the commercial power grid in the nighttime when the electricity rate is relatively low and the power discharged from the electricity storage device is supplied to one or more loads when the amount of power to be generated by the solar power generation apparatus is insufficient in the daytime when the electricity rate is relatively high (see Japanese Patent Application Publication No. H10-201129 or Japanese Patent Application Publication No. 2002-369406). The conventional system supplies power, charged in the electricity storage device, to the loads when the amount of power generated by the solar power generation apparatus is small and does not fulfill the power demand of the loads, as in cloudy or rainy weather, thereby suppressing costs (electricity costs) that are incurred by the power supply from the commercial power grid.

However, the conventional electricity storage device converts the AC power, supplied from the commercial power grid, into DC power and then stores it, and needs to reversely convert the DC power into AC power when supplying power to the loads, so that there is a power loss corresponding to the sum of power loss during AC-DC conversion and power loss during DC-AC conversion. For this reason, there may be cases where in fine weather in which the solar power generation apparatus can generate sufficient power, power (energy) savings and reduction in electricity costs can be achieved by supplying power directly from the commercial power grid, rather than compensating for the deficit with the power that was charged in the electricity storage device at the previous night.

SUMMARY OF THE INVENTION

In view of the above, the present invention provides a grid-connected power supply system that is capable of achieving power (energy) savings while reducing power (electricity) costs.

In accordance with one aspect of the present invention, there is provided a grid-connected power supply system including: a power generation apparatus configured to generate power by using natural energy and connected in parallel to a commercial power grid; a electricity storage device configured to convert AC power, supplied from the commercial power grid, into DC power to be charged with the DC power, and to convert a discharged DC power into AC power and supply the AC power to one or more loads; and a control device configured to control charging and discharging of the electricity storage device, wherein the control device predicts an amount of power to be generated on a subsequent day by the power generation apparatus and a power demand of the loads and charges the electricity storage device with power in a time zone in which an electricity rate of the commercial power grid is relatively low if a predicted value of the amount of power to be generated is lower than a predicted value of the power demand, or does not charge the electricity storage device with power during the time zone if the predicted value of the amount of power to be generated is not lower than the predicted value of the power demand.

With such configuration, the electricity storage device is charged during a time zone in which the electricity rate of the commercial power grid is relatively low if the predicted value of the amount of power to be generated is smaller than the predicted value of the power demand, thereby reducing electricity costs. In contrast, the electricity storage device is not charged during the time zone if the predicted value of the amount of power to be generated is not lower than the predicted value of the power demand, thereby eliminating power loss attributable to the charging and discharging of the electricity storage device and therefore achieving power (energy) savings.

Preferably, the control device may charge the electricity storage device with power in a time zone in which an electricity rate of the commercial power grid is relatively low, and discharge power from the electricity storage device in a time zone in which the electricity rate is relatively high.

With such configuration, the electricity storage device is charged with power during the time zone in which the electricity rate of the commercial power grid is relatively low and then the power is discharged from the electricity storage device during the time zone in which the electricity rate is relatively high, thereby reducing power (electricity) costs.

Preferably, the grid-connected power supply system may further include a manipulation reception unit for receiving manipulation input related to the power demand of the loads, wherein the control device predicts the power demand of the loads based on the manipulation input received by the manipulation reception unit.

With such configuration, the control device predicts the power demand of the loads based on manipulation input related to the power demand of the loads, for example, input of the fact that the power demand is lower than normal due to absence of person, or power demand is higher than normal due to presence of many people, and therefore the power demand of the loads in a situation different from a normal situation can be predicted more accurately.

Preferably, the control device may compare an amount of power dischargeable from the electricity storage device with a predicted value of the power demand of the loads, and provide notification if it is determined that the amount of dischargeable power will be less than the power demand of the loads within a predetermined time period.

With such configuration, the user is notified of, for example, the fact that the power demand of the loads will not be fulfilled by the discharging of power from the electricity storage device after some hours, thereby prompting the user to suppress the power consumption of the loads.

Preferably, the control device may have a function of controlling operations of electric devices as the loads, and sequentially control the operations of the electric devices in order of priority so that power consumption is reduced if it is determined that the amount of dischargeable power will be smaller than the power demand of the loads within the predetermined time.

With such configuration, the power consumption of an electric device is forcibly reduced, and therefore the period for which power can be supplied from the electricity storage device can be lengthened.

Preferably, when the predicted value of the amount of power to be generated is smaller than the predicted value of the power demand, the control device may make a schedule for the power demand of the loads that prevents the predicted value of the amount of power to be generated from being smaller than the predicted value of the power demand, and present the schedule to a user.

With such configuration, a user can be encouraged to save power (energy).

In accordance with the present invention, it is possible to achieve power (energy) savings while reducing power (electricity) costs.

BRIEF DESCRIPTION OF THE DRAWINGS

The objects and features of the present invention will be apparent from the following description of embodiments when taken in conjunction with the accompanying drawings, in which.

DETAILED DESCRIPTION OF THE PREFERRED EMBODIMENTS

Figure 1:
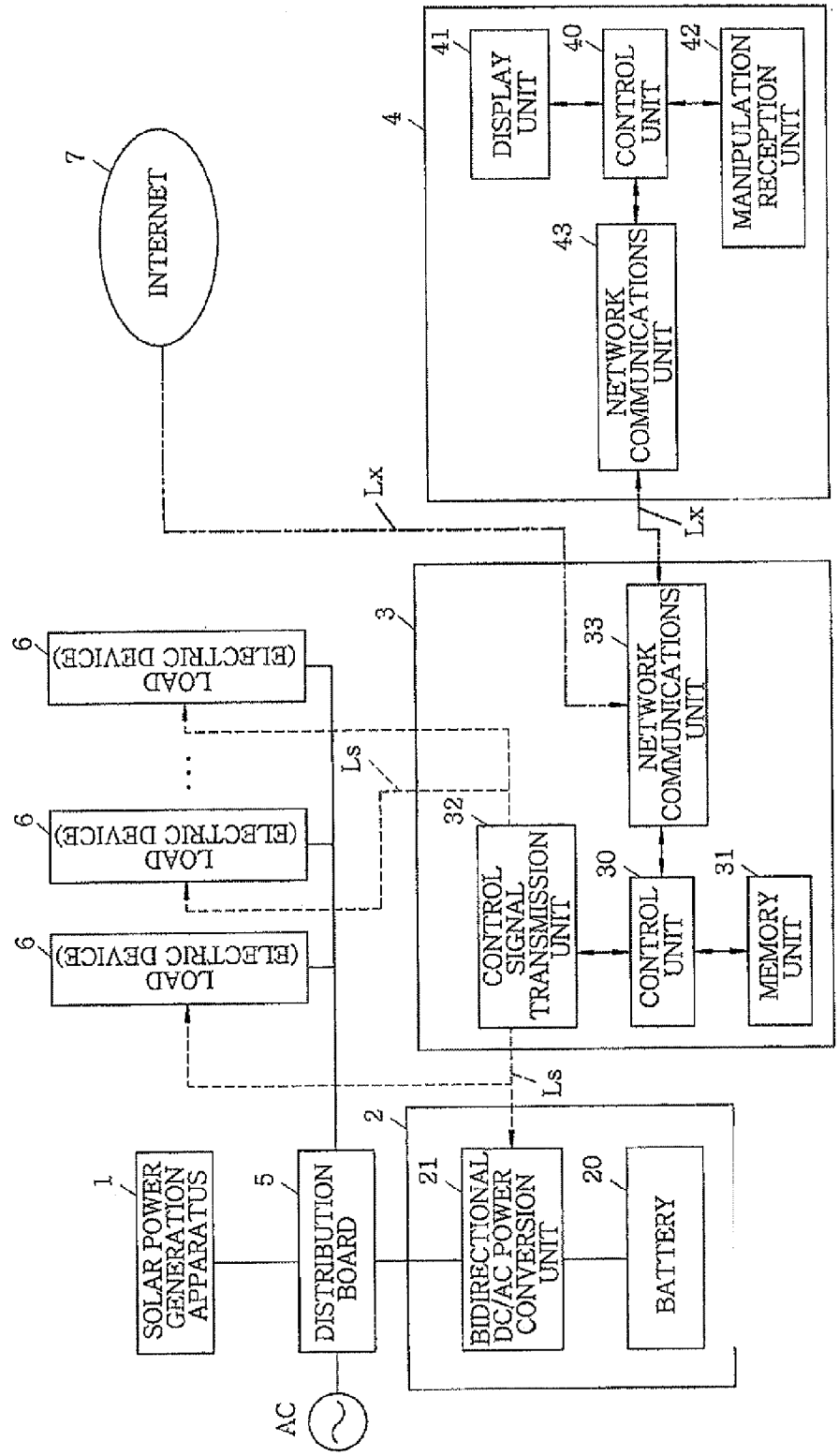
FIG. 1 is a system configuration diagram illustrating an embodiment of the present invention.

Embodiments of the present invention will be described in detail below with reference to the accompanying drawings that constitute a part hereof. The same reference numerals will be assigned to the same or similar components throughout the drawings, and redundant descriptions thereof will be omitted.

A grid-connected power supply system in accordance with an embodiment of the present invention, which includes a solar power generation apparatus as a power generation apparatus using natural energy and is installed to a house, will now be described with reference to the drawings in detail. However, the power generation apparatus in the grid-connected power supply system in accordance with the present invention is not limited to a solar power generation apparatus, but may be a power generation apparatus using a different type of natural energy, for example, a wind power generation apparatus. Furthermore, the place where the grid-connected power supply system of the present embodiment is installed is not limited to a house, but may also be a multiple dwelling house or an office.

The grid-connected power supply system of the present embodiment, as shown in FIG. 1, includes a solar power generation apparatus 1 connected in parallel to a commercial power grid AC, a electricity storage device 2 configured to store (charge) AC power supplied from the commercial power grid AC and supply charged AC power to loads 6, a control device 3 configured to control the charging and discharging of the electricity storage device 2, and a display manipulation device 4. Furthermore, the solar cell array (not shown) and the electricity storage device 2 of the solar power generation apparatus 1 are installed outside a house, while a power conditioner (not shown), the control device 3 and the display manipulation device 4 of the solar power generation apparatus 1 are installed in the house.

The solar power generation apparatus 1 is known in the art, and includes a solar cell array including solar cells and the power conditioner including an inverter for converting DC power, output from the solar cell array, into AC power. Furthermore, the solar power generation apparatus 1 may reversely supply (sell) the surplus of generated power to the commercial power grid AC.

The electricity storage device 2 includes a storage battery 20, such as a lead-acid battery, and a bidirectional DC/AC power conversion unit 21 for converting AC power, supplied from the commercial power grid AC and the solar power generation apparatus 1, into DC power and charging the storage battery 20 with the DC power, and converting DC power, discharged from the storage battery 20, into AC power. Furthermore, the bidirectional DC/AC power conversion unit 21 may switch between a charging operation (the conversion of AC power into DC power), a discharging operation (the conversion of DC power into AC power), and the stopping of the operation in response to control signals transmitted from the control device 3 via a signal line Ls, as described later. Furthermore, since loss occurs in the bidirectional DC/AC power conversion unit 21 during the conversion of AC power to DC power and during the conversion of DC power to AC power, the power supplied to the loads 6 during discharging is less than the power supplied from the commercial power grid AC during charging.

The distribution board 5 is connected to the commercial power grid AC on the primary side thereof, and includes, on the secondary side thereof, a main breaker (not shown) connected in parallel to the solar power generation apparatus 1 (the output terminal of the power conditioner) and the electricity storage device 2 and branch breakers (not shown) branched from the secondary side of the main breaker. AC power is supplied from the commercial power grid AC, the solar power generation apparatus 1 and the electricity storage device 2 to the loads 6 via the branch breakers. The loads 6 are, for example, electrical devices such as an air conditioner, a television set, an electronic cooking utensil, and a refrigerator. The operations of some of the loads 6 can be controlled by using control signals transmitted from the control device 3 via signal lines Ls, as will be described later.

The control device 3 includes a control unit 30 configured to have a microcomputer as a main component, a memory unit 31 formed of electrically rewritable semiconductor memory (for example, flash memory) and configured to store a program executable by the microcomputer of the control unit 30 and a variety of data, a control signal transmission unit 32 configured to transmit control signals to the electricity storage device 2 or loads 6 via the signal lines Ls, and a network communications unit configured to perform network communications with the Internet 7 via a communications line Lx such as a telephone line, a CATV coaxial cable or an optical fiber cable.

The control unit 30 controls, using control signals transmitted from the control signal transmission unit 32 via the signal lines Ls, not only the stopping of the operation, charging and discharging of the bidirectional DC/AC power conversion unit 21 of the electricity storage device 2, but also the operations of some controllable loads 6. Furthermore, the control signal transmission unit 32 may transmit control signals not only via the dedicated signal lines Ls, but via, for example, power feed lines, already arranged at a home, using a power line communications technology, or radio waves as a communications medium, like a low-power radio communications station. The network communications unit 33 includes a communications device (LAN controller) using a wired LAN (100BASE-TX or the like) having a twisted pair cable (LAN cable) as a communications medium (communications line Lx), or includes a modem (an ADSL modem, an Optical Network Unit (ONU), a cable modem or the like) configured to access the Internet 7 over a telephone line, an optical fiber line or a CATV line to perform data communications with a variety of websites. Furthermore, since data communications with a website is performed via the Internet 7, a unique IP address (a global IP address) has been assigned to the modem.

In the meantime, the control unit 30 predicts the amount of power to be generated on the subsequent day by the solar power generation apparatus 1 and the amount of power (power demand) to be consumed on the subsequent day by the loads 6. A method for predicting the amount of power to be generated on the subsequent day by the solar power generation apparatus 1 includes a method of predicting the amount of power to be generated on the subsequent day by the solar power generation apparatus 1 based on the predicted highest temperature or the amount of predicted solar radiation on the subsequent day which is acquired from a website which provides weather information such as weather forecasts (for example, the website of a central meteorological agency or a district meteorological agency) via the Internet 7. Furthermore, a method for predicting the power demand for the subsequent day includes a method of predicting the power demand based on history information such as past power consumption history and the past weather information.

The display manipulation device 4 includes a control unit 40 configured to have a microcomputer as a main component; a display device, such as an LCD monitor or an organic EL display, a display unit 41 configured to indicate (display) visual information, such as characters, diagrams and symbols, by operating the corresponding display device; a manipulation reception unit 42 formed of a touch panel combined with the display device, and configured to receive a variety of types of manipulation input generated when a user (resident) touches the touch panel and sends them to the control unit 40; and a network communications unit 43 formed of the communications device (LAN controller) that is the same as the network communications unit 33 of the control device 3 and configured to perform packet communications with the control device 3 via the communications line Lx (LAN cable). Furthermore, in order to perform corresponding packet communications, the control device 3 and the display manipulation device 4 have been assigned respective unique IP addresses (individual IP addresses).

Figure 2:
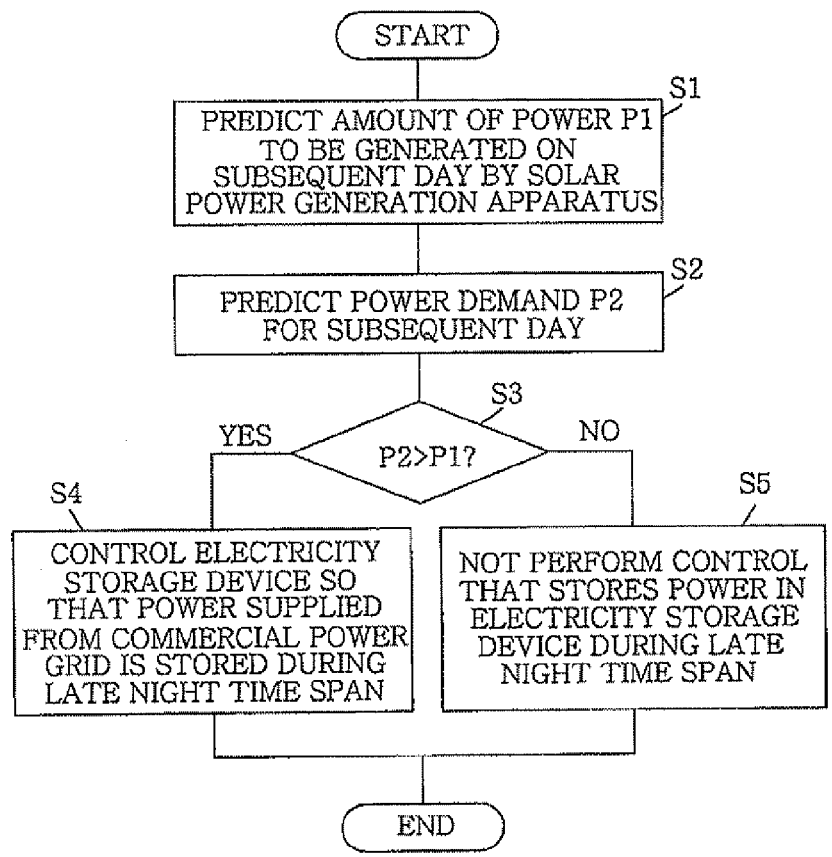
FIG. 2 is a flowchart illustrating the operation of the control device shown in FIG. 1.

Next, the control operation of the control device 3, which is the gist of the present invention, will be described with reference to the flowchart of FIG. 2. Here, with regard to the commercial power grid AC, electricity rates are set for respective time zones. For example, the same electricity rate is set for a morning time zone of 7 a.m. to 10 a.m. and a evening time zone of 5 p.m. to 11 p.m., the highest electricity rate is set for the diurnal time zone of 10 a.m. to 5 p.m., and the lowest electricity rate is set for a late-night time zone of 11 p.m. to 7 a.m. of the subsequent morning. That is, when the same amount of power is supplied from the commercial power grid AC, the electricity rate in the late-night time zone is lowest and the electricity rate in the diurnal time zone is highest.

For example, when the time (11 p.m.) is reached from which the time zone having the lowest electricity rate of the commercial power grid AC starts, the control unit 30 predicts the amount of power P1 to be generated on the subsequent day by the solar power generation apparatus 1 based on the predicted highest temperature and the amount of predicted solar radiation on the subsequent day which are acquired from a website by the network communications unit 33 (step S1), also predicts the power demand P2 of the loads 6 on the subsequent day based on the history of past power demand (step S2), and compares the amount of predicted power P1 to be generated on the subsequent day with the predicted power demand P2 for the subsequent day (step S3).

If the amount of power P1 to be generated on the subsequent day is smaller than the power demand P2 for the subsequent day, the control unit 30 controls the electricity storage device 2 (the bidirectional DC/AC power conversion unit 21) so that it stores the AC power supplied from the commercial power grid AC during the time zone (11 p.m. to 7 a.m. of the subsequent morning) in which the electricity rate is lowest (step S4). Meanwhile, if the amount of power P1 to be generated on the subsequent day is not smaller than the power demand P2 for the subsequent day, the control unit 30 does not perform the control that stores power in the electricity storage device 2 during the late-night time zone (step S5).

As described above, in the present embodiment, the control unit 30 of the control device 3 predicts the amount of power to be generated on the subsequent day by the solar power generation apparatus 1 and the power demand of the loads 6 on the subsequent day, and compares the amount of power to be generated with the power demand. If the predicted value P1 of the amount of power to be generated is smaller than the predicted value P2 of the power demand, the electricity storage device 2 is charged during the late-night time zone in which the electricity rate of the commercial power grid AC is relatively low, thereby reducing electricity costs. In contrast, if the predicted value P1 of the amount of power to be generated is not lower than the predicted value P2 of the power demand, the electricity storage device 2 is not charged during the time zone, thereby eliminating power loss attributable to the charging and discharging of the electricity storage device 2 and achieving power (energy) savings.

In this case, since the memory unit 31 of the control device 3 stores information, such as the history of past power demand, and the control unit 30 predicts the power demand for the subsequent day based on the history of past power demand stored in the memory unit 31, there is concern that the predicted value P2 of the power demand may be considerably different from the actual power demand if the situation is different, as in a situation where the power demand is lower than normal due to absence of person, or a situation where the power demand is higher than normal due to presence of many people.

Accordingly, when the manipulation reception unit 42 of the display manipulation device 4 receives a manipulation input related to the power demand of the loads 6, for example, an manipulation input indicative of an irregular increase or decrease in power demand such as that described above, the corresponding indication is transferred from the control unit 40 of the display manipulation device 4 to the control unit 30 of the control device 3 via the network communications unit 43. Meanwhile, the control unit 30 of the control device 3 predicts the power demand of the loads based on the indication received from the display manipulation device 4, that is, information about the fact that the power demand for the subsequent day is higher (or lower)

than normal, and therefore the power demand of the loads 6 in a situation different from a normal situation can be predicted more accurately.

Furthermore, if the amount of power to be generated on the subsequent day by the solar power generation apparatus 1 is smaller than the predicted power demand of the loads 6 on the subsequent day, the control unit 30 of the control device 3 charges the electricity storage device 3 with power in a time zone in which the electricity rate of the commercial power grid AC is relatively low (for example, a morning or nocturnal time zone), and discharges power from the electricity storage device 3 during a time zone of the subsequent day in which the electricity rate is relatively high (for example, a diurnal time zone), thereby reducing electricity costs.

Meanwhile, the bidirectional DC/AC power conversion unit 21 of the electricity storage device 2 detects the power level (the amount of dischargeable power) of the storage battery 20 based on, e.g., the battery voltage of the storage battery 20, and sends information about the power level to the control unit 30 of the control device 3 when receiving a control signal inquiring about the power level from the control unit 30 of the control device 3. Furthermore, when power is discharged from the electricity storage device 2, the control unit 30 of the control device 3 may compare the amount of power dischargeable from the electricity storage device 2 (the power level of the storage battery 20) with the predicted value P2 of the power demand of the loads 6, and, if it is determined that the amount of dischargeable power will be less than the power demand of the loads 6 within a predetermined time period (for example, 1 to 2 hours), notifies the user (resident) of the fact by displaying a relevant message, for example, a message indicating that the supply of power from the electricity storage device 2 will be impossible within some hours if no change were to be made, on the display unit 41 of the display manipulation device 4, thereby prompting the user to suppress the power consumption of the loads 6. Furthermore, although only visual notification is provided, audible notification as well as visible notification may be provided in the present embodiment by installing a speaker in the display manipulation device 4 and allowing the corresponding speaker to issue a voice message.

Furthermore, if it is determined that the amount of power dischargeable from the electricity storage device 2 will be less than the power demand of the loads 6 within the predetermined time as described above, the control unit 30 of the control device 3 sequentially controls the operation of the loads (electric devices) 6 in a predetermined order of priority so that the power consumption of the loads 6 can be reduced. For example, when the set temperature of the air conditioner is changed or an air conditioner is stopped, the power consumption of the electric device is forcibly reduced and therefore the period for which power can be supplied from the electricity storage device 2 can be lengthened.

Figure 3:
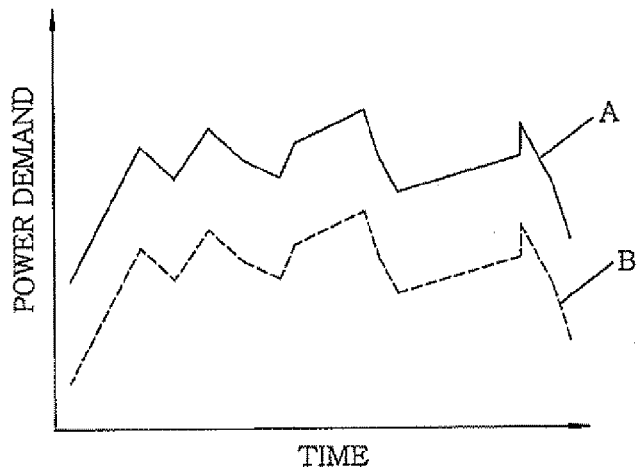
FIG. 3 is an example of the schedule for the power demand of the control device shown in FIG. 1.

Furthermore, when the predicted value P1 of the amount of power to be generated is less than the predicted value P2 of the power demand, the control unit 30 of the control device 3 makes the schedule for the power demand of the loads 6 that prevents the predicted value P1 of the amount of power to be generated from being less than the predicted value P2 of the power demand, and presents the schedule to a user. For example, when the schedule for the power demand for a normal day (one day) is represented by the solid line A of FIG. 3, the control unit 30 makes the schedule for the power demand represented by the dotted line of FIG. 3, and creates web content that allows the newly made schedule for the power demand to be represented as the schedule for the power demand for a normal day and delivers it to the display manipulation device 4. The display manipulation device 4 plays back web content, delivered by the control device 3, using the web browser function of the control unit 40, and displays the schedules for the power demand, such as those shown in FIG. 3 (the solid line A and the dotted line B), on the screen of the display unit 41. As a result, a user who views the schedule for the power demand displayed on the display unit 41 is encouraged to save power (energy).

Although the embodiments of the present invention have been described above, the present invention is not limited to these specific embodiments, but a variety of variations and modifications are possible without departing from the scope of the following claims and fall within the scope of the present invention.

What is claimed is:

1. A grid-connected power supply system comprising:
a power generation apparatus configured to generate power by using natural energy and connected in parallel to a commercial power grid;
an electricity storage device configured to convert AC power, supplied from the commercial power grid, into converted DC power to charge the electricity storage device, and to convert a discharged DC power into converted AC power and supply the converted AC power to one or more loads; and
a control device configured to control charging and discharging of the electricity storage device; and
a display unit,
wherein the control device predicts an amount of power to be generated on a subsequent day by the power generation apparatus and a power demand of the loads on the subsequent day and charges the electricity storage device with power during a time period in which an electricity rate of the commercial power grid is relatively low if a predicted value of the amount of power to be generated is lower than a predicted value of the power demand, and does not charge the electricity storage device with power during the time period if the predicted value of the amount of power to be generated is not lower than the predicted value of the power demand,
wherein, when the predicted value of the amount of power to be generated is smaller than the predicted value of the power demand, the control device makes a schedule for the power demand of the loads that prevents the predicted value of the amount of power to be generated from being smaller than a scheduled value of the power demand, and presents both the schedule for the power demand of the loads and a schedule for a power demand for a normal day to a user on the display unit at the same time, and
wherein the control device includes a network communications unit and predicts the amount of the power to be generated on the subsequent day by the power generation apparatus based on highest temperature or an amount of predicted solar radiation on the subsequent day which is acquired from the network communications unit.

2. The grid-connected power supply system of claim 1, wherein the control device discharges power from the electricity storage device during a second time period in which the electricity rate is relatively high.

3. The grid-connected power supply system of claim 1, further comprising a manipulation reception unit for receiving manipulation input related to the power demand of the loads, wherein the control device predicts the power demand of the loads based on the manipulation input received by the manipulation reception unit.

4. The grid-connected power supply system of claim 1, wherein the control device compares an amount of power dischargeable from the electricity storage device with the predicted value of the power demand of the loads, and provides notification if it is determined that the amount of the dischargeable power will be less than the power demand of the loads within a predetermined time period.

5. The grid-connected power supply system of claim 4, wherein the control device has a function of controlling operations of electric devices as the loads, and sequentially controls the operations of the electric devices in order of priority so that power consumption is reduced if it is determined that the amount of the dischargeable power will be smaller than the power demand of the loads within the predetermined time.

\* \* \* \* \*